Sept. 17, 1963 W. WENNEMANN 3,104,309
TUBE-WELDING MACHINE
Filed Jan. 26, 1962 2 Sheets-Sheet 1

INVENTOR
WERNER WENNEMANN
BY
Attorney

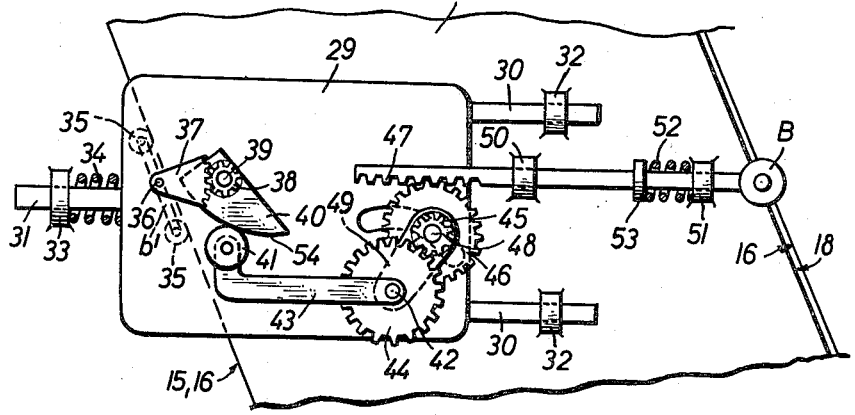
Fig. 3
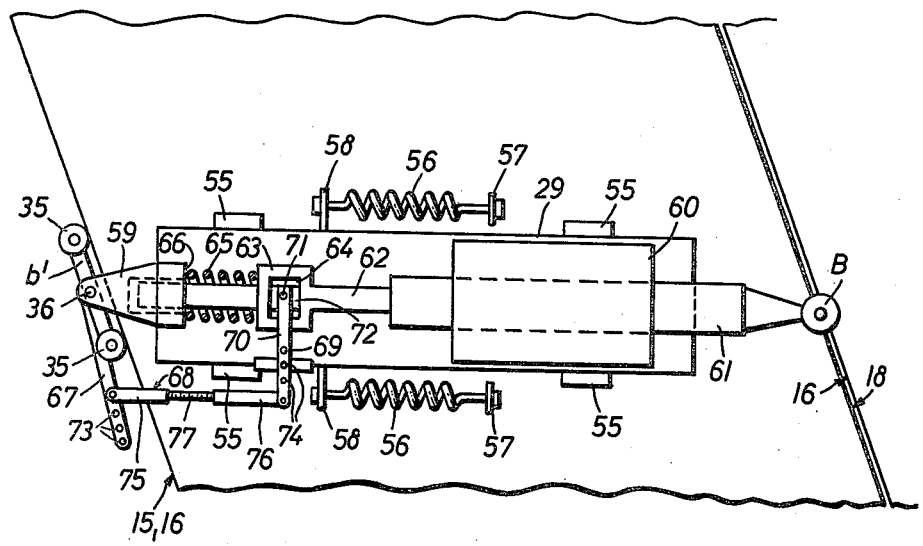
Fig. 4
INVENTOR
WERNER WENNEMANN
BY
Attorney

United States Patent Office 3,104,309
Patented Sept. 17, 1963

3,104,309
TUBE-WELDING MACHINE
Werner Wennemann, Dortmund, Germany, assignor to Hoesch Aktiengesellschaft, Dortmund, Germany, a corporation of Germany
Filed Jan. 26, 1962, Ser. No. 168,913
Claims priority, application Germany Mar. 13, 1961
4 Claims. (Cl. 219—62)

My invention relates to apparatus for the arc welding of skelp helically bent into tubes and more particularly to automatic control mechanisms for the welding head of such apparatus to insure a proper position of the welding head relative to the edges of the tubularly bent skelp.

In arc welding of skelp helically bent into tubes it is important that not only the width of the gap between the windings of the skelp is kept constant but also that the welding head operates constantly in a position above the center line of said gap to place the welding seam precisely between or relative to the edges to be connected. Even if the said width of the welding gap is kept constant the smallest deviations of the welding head from its said central position cause serious defects of the welding such as defective roots of the weld, inclusions of slag and of gases, and others. If said deviations are substantial, a welding of the edges of the skelp will not be achieved at all.

To regulate the width of the welding gap in the helically bent skelp it has already been suggested to scan optically or mechanically the width of the gap and if the same deviates from the desired width to cause the tube leaving the welding apparatus to tilt by a small angle in one or the other direction until the desired width of the gap at the point of welding is reestablished. To control the position of the welding head a feeler or tracer has been used which contacts one of the two edges of the skelp approaching the welding head and follows its parallel dislocations in axial direction of the tube, which dislocations are accordingly transferred to the welding head.

However these known control mechanisms for the welding head were not satisfactory because the welding head was still not fully prevented from deviating from its most effective position above the center line of the welding gap. It has been ascertained that these deviations resulted not only from the said parallel dislocations of the skelp edge but also from changes of the angle of inclination or pitch of the helically wound edges which changes have not been suspected when using skelp of constant width in view of the constant relation between said width, the given diameter of the tube being formed and the said angle of inclination or pitch. Additional investigations showed that actually the skelp bending means do not assure a really constant diameter of the formed tube, this causing variations of the said angle of inclination. Further, the unavoidably sabre-shaped skelp, even if skelp of constant width is processed, causes fluctuations of the angle of inclination. Finally this angle under which the skelp is fed into the bending means cannot be maintained constant because of the required play in the feeding means.

The object of my invention is to provide control means for the welding head which will avoid the said disadvantages. According to my invention the welding head is so controlled that it is not only in known manner displaced in axial direction of the tube in accordance with in the same direction occurring dislocations of the skelp entering the bending means, but is additionally displaced in accordance with angular deviations of the skelp edge from its desired pitch. Thus the welding head is controlled by two mutually independent values and is always positioned to effect the best possible welding.

In one embodiment of my invention the said control means for the welding head comprise a feeler or tracer or other contact member which touches one of the edges of the skelp in at least two points and which is operatively connected with the welding head to transmit thereto any parallel or angular dislocations of said edge. Thus, while the above mentioned known feeler or tracer follows only one kinetic impulse namely in axial direction of the formed tube my new contact member follows an additional, namely a rotative kinetic impulse in accordance with variations of the pitch of the edge of the skelp.

If my new control means are applied to the welding head acting at the point where the wound edges of the skelp meet for the first time, then the welding head may be rigidly connected with said contact member or feeler or tracer because the said edges between the contact member and the welding head are straight for all practical purposes.

If the tube is welded from skelp of constant width and if my new control means are applied to a welding head acting at a point shifted by at least 180° from the point where the skelp edges meet for the first time, then the contact member is rotatably placed on a carriage which is movable by elastic means in a direction parallel to the axis of the tube, and is provided with a gearing which transforms the rotational movement of the contact member into a linear displacement and which actuates a slide connected with the welding head, so that the same will follow both motional impulses.

In another embodiment of my invention the said gearing is so designed that it may be used for any desired pitch of a skelp of constant width when tubes of different diameters are to be made. In such embodiment a cam disk is used which automatically changes the transmission ratio of the gearing when the contact member angularly moves into another position. To permit the welding of skelp of different width into tubes of the same or different diameters, the gearing may be provided with change wheels which will allow the adjustment to another width of skelp by just exchanging one of the wheels.

The said and other objects of my invention will be more fully understood from the following specification when read with the accompanying drawing in which these embodiments are illustrated.

In the drawing:

FIG. 3 shows in front view the control means for the welding head effecting a second or third welding seam, and FIG. 4 shows in front view an amended embodiment of the control means shown in FIG. 3.

The same reference numerals indicate the same or equivalent elements in all figures of the drawing.

Figure 1:
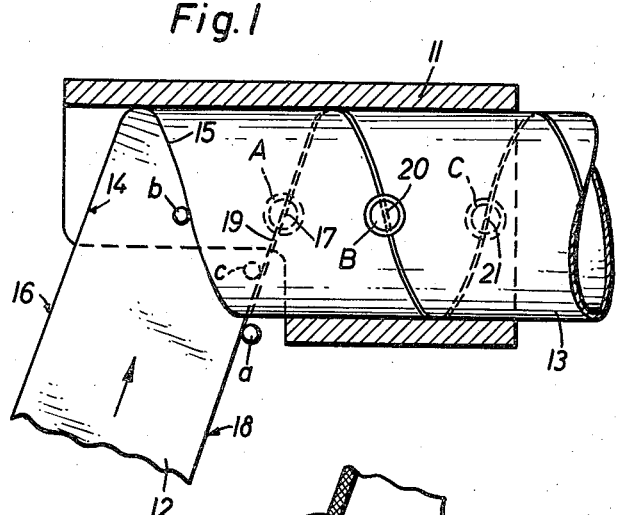
FIG. 1 illustrates schematically skelp fed into and helically bent in a bending sleeve shown in longitudinal section and the location of the welding heads and of the points from which the control of said heads is derived.

The control means described hereinafter will often require a device of the known type for regulating the width of the welding gap at the place where the first welding is performed; such regulating device is not shown in the drawing.

As illustrated in FIG. 1 a flat strip of skelp 12 is tangentially fed in the direction of the shown arrow and in inclined position into the bending sleeve 11 wherein it is helically bent to form the emerging tube 13; the pitch of the helically bent skelp will conform to the angle of inclination of the edges 16, 18 of the skelp. The customary means to feed the skelp into the sleeve 11 and to propel it therethrough are not shown.

The first winding 15 of the left edge 16 of the skelp 12 will start at point 14 and said edge 16 after having proceeded 360° will for the first time oppose at the point 17 the right edge 18 of the skelp which up to this point 17 ran in a straight line. At this point 17 or at a small distance beyond the same the first welding is performed by the welding head A which is located within the sleeve 11. The slightly distanced edges 16, 18 enclose the welding gap into which the welding head A places the first welding seam from inside the tube. The welding head A is controlled by a feeler or tracer or other contact member $a$ which is operatively connected thereto in a manner described hereinafter.

From point 17 the welded edges 16, 18 proceed by 180° to point 20 where a second welding head B operating through an opening of the sleeve 11 from outside thereof places a second welding seam on the outer surface of tube 13. This second welding head B is controlled by a second contact member $b$ which contacts the helical skelp edge 16 within its first turn at a distance of one pitch from said point 20. If the application of a third welding seam is desired, a third welding head C is provided within the sleeve 11 at the point 21 said head C being distanced from the head A by one pitch of the helical skelp edges and positionally controlled by a third contact member $c$ cooperating with the skelp edge 16, and distanced from point 21 by about one pitch of the helical skelp edges.

Figure 2:
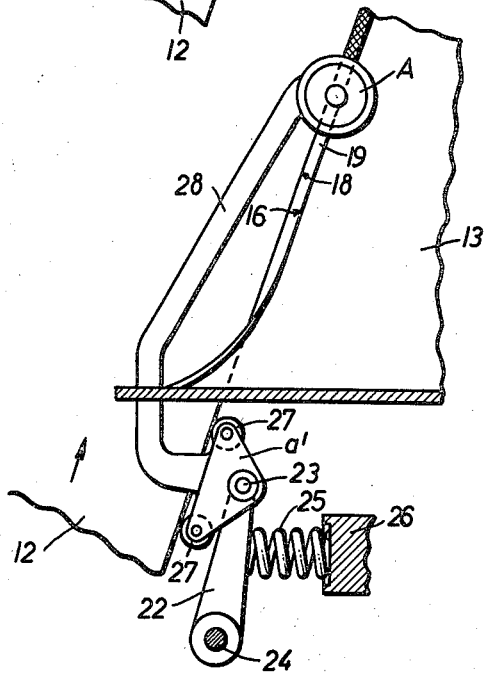
FIG. 2 shows in front view, partly in section, the control means for the welding head effecting the first welding seam.

The above mentioned means to positionally control the welding head A are illustrated in FIG. 2. The winding sleeve 11 shown in FIG. 1 has been omitted and only a portion of the bent skelp 12 forming the tube 13 is shown in a horizontal section.

The contact member or tracer comprises two rollers 27 slidingly scanning the skelp edge 18 and rotatably mounted in a rocker $a'$ seated at the outer end of the lever 22 which pivots on the stationary journal 24. A spring 25 mounted between said lever 22 and a stationary abutment 26 keeps the said rollers 27 in permanent contact with said skelp edge 18. An arm 28 connects the welding head A rigidly with said rocker $a'$ and transmits all parallel and angular dislocations of said edge 18 to the welding head A. Thus this welding head, when the width of the welding gap is kept constant, will be continuously located above the centerline of the welding gap and in any case at a constant horizontal distance from the edge 18, mostly not exceeding 0.5 mm.

The control means shown in FIG. 2 is applicable even when skelp of varying width is processed. In such case it is only necessary that the curvature of the edge 18 resulting from the sabre-shaped skelp be kept so small that for all practical purposes the edge 18 between the welding head A and the contact member $a$ is straight.

In the embodiment shown in FIG. 3 the control mechanism for the welding head B comprises again a rocking member $b'$ with rollers 35 which scan the skelp edge 16. This rocking member $b'$ is keyed to a vertical shaft 36 rotatably mounted in a carriage 29 which is provided with guide rods 30, 31 longitudinally displacable in bearings 32 and 33, respectively. These bearings are secured to the not shown winding sleeve (such as 11 in FIG. 1). A helical spring 34 tends to move the carriage 29 to the right and thus to maintain a permanent contact between the scanning rollers 35 and the skelp edge 16 within its first winding 15 (see FIG. 1).

Said shaft 36 has further keyed on a toothed segment 37 which engages a pinion 38 keyed to the shaft 39 rotatably mounted on the slide 29. The shaft 39 has also keyed on a cam disk 40 which cooperates with the roller 41 held by the lever arm 43 mounted on shaft 42 which is rotatably seated in the carriage 29 and turns the keyed on toothed wheel 44 engaging the pinion 45. This pinion 45 and another toothed wheel 46, which engages the toothed rod 47, are keyed to the shaft 48 which is rotatably mounted in the arm 49 swingably held by the shaft 42. The toothed wheel 46 may be substituted if required by a wheel of different diameter.

The said toothed rod 47 is seated in bearings 50, 51 attached to the winding sleeve 11, is shiftable in axial direction of the tube being formed and supports on its outer end the welding head B. A helical spring 52 mounted between the stationary bearing 51 and the collar 53 on rod 47 tends to push the rod 47 to the left thereby maintaining the roller 41 in permanent contact with the cam disk 40.

The contact piece or tracer $b'$ follows each parallel and each angular dislocation of the skelp edge 16. An exclusive parallel displacement of the contact member $b'$ is transferred directly by the carriage 29 and the rod 47 to the welding head B without actuation of the cam disk 40, the lever 43 and the gearing 44, 45, 46. The tilting of the contact member $b'$, caused by any change of the angular position of the skelp edge 15 causes an additional displacement of the rod 47 relative to the carriage 29. The transmission ratio of said gearing 44, 45, 46 and the shape of the cam disk 14 are so chosen that, provided the width of the skelp is constant, the distance of the welding head B from the skelp edge 18 will remain unchanged whereby the welding head will always operate above the center line of the welding gap.

The correct relation between the tilt angle of the contact member $b'$ and the displacement of the rod 47, as required for the proper control of the welding head B can be determined empirically or computationally. The computed functional equation includes as a parameter the width of the skelp and the desired angle of inclination of the welding gap or the diameter of the formed tube. It turned out to be possible to shape the operative surface 54 of the cam disk 40 so that the gearing is usable for all practically occuring tube diameters and skelp widths, requiring only an exchange of the toothed wheel 46 if the skelp width is changed. Therefore the same control mechanism may be used in connection with winding sleeves for different tube diameters.

The control mechanism illustrated in FIG. 4 comprises again a horizontally displaceable carriage 29 seated on the not shown winding sleeve 11. Said carriage is supported and guided by vertical rocking bars 55 (their upper ends only being shown in top view) which are with their lower end articulated to the winding sleeve 11 and with their upper end articulated to the carriage 29. Springs 56, which are with one end at 57 attached to the winding sleeve and with their other end to projections 58 of the carriage 29, tend to push the carriage 29 to the right as does the spring 34 in FIG. 3.

The contact member or tracer $b'$ with rollers 35 is rockably held by a pin 36 mounted in the extension 59 of carriage 29. Any parallel dislocation of the skelp edge 15 is scanned by the rollers 35 of the contact member $b'$ and is transferred thereby directly to the carriage 29.

A sleeve 60 mounted on carriage 29 slidingly supports a rod 61 which holds on its outer right end the welding head B. The inner left end 62 of said rod 61 carries a framelike head piece 63 including a slotted link 64. A spring 65 located between the face 66 of the extension 59 and said head piece 63 tends to move the rod 61 to the right relative to the carriage 29.

A lever 67 rigidly connected to the rockable contact piece $b'$ transmits any angular displacement of the contact piece through the connecting rod 68 to one arm of the two armed lever 70 which is rotatably mounted at 69 on the carriage 29. The outer end of the other arm of the lever 70 holds rotatably by means of a pin 71 a sliding block 72 which moves in the slotted link 64 transversely to the direction of movement of the carriage 29.

An exclusively parallel dislocation of the skelp edge 15, 16 is directly transferred to the welding head B through the carriage 29 and rod 61 without actuating the lever member 67, 68 and 70. An exclusively angular dislocation of the skelp edge 15, 16 causes a tilting movement of the contact member $b'$ and this movement is transferred as a linear movement to the rod 61 and thus to the welding head B through the lever members 67, 68, 70 and the link connection 63, 64, 72. An appropriate choice of the length of the said lever members will permit to adapt, with sufficient accuracy, the displacement of the welding head B to any dislocation of the skelp edge 18 resulting from any angular dislocation of the skelp edge 15, 16.

To permit an adjustment of the control mechanism to different widths of the skelp and to different tube diameters, the lengths of the levers 67 and 70 and of the connecting rod 68 may be changed. For this purpose the lever 67 is provided with a plurality of hinge points 73 for the outer end of connecting rod 68 which is also lengthwise adjustable and is for example constructed as a coupling unit composed of two threaded sleeves 75, 76 and an intermediate set-screw 77. The lever 70 is also provided with a pluarlity of fulcrum bores 74.

A control mechanism of the type described before and illustrated in FIGS. 3 and 4 may be used also for a third welding head C shown in FIG. 1. However, the co-operating contact member $c$ must be located, not like the member $b$ relative to head B distanced by a turn of the helical skelp edge 18, but distanced slightly greater as shown in FIG. 1 because of the location of the welding head A.

The three control mechanisms as shown and described for one or two or three welding heads operate exclusively by mechanical means. However, the mechanical means for scanning the position of the skelp edge and for displacing the welding head may, as will be readily understood by anyone skilled in the art, be replaced by conformingly acting hydraulic or electric means. Also, instead of the shown bending or winding sleeve 11 any other bending or winding means may be used to helically bend a skelp into tubular for form.

While specific embodiments of my invention have been shown and described in detail to illustrate the application of the principles of my invention, it will be well understood that the same may be otherwise embodied without departing from such principles and without avoiding the scope of my appended claims.

What I claim as my invention is:

1. Control mechanism for welding heads in machines for arc welding skelp helically bent into tubes, comprising in combination first means adjustingly displacing the welding head in axial direction of the tube in accordance with any in the same direction occurring dislocations of the skelp approaching the welding head, and second means concurrently causing a composite displacement of the welding head in accordance with any angular deviations of the skelp approaching the welding head from its desired helical pitch.

2. A control mechanism for welding heads in machines for arc welding skelp helically bent into tubes and adapted to operate at the place where opposing edges of the bent skelp meet for the first time, said control mechanism comprising in combination a tiltably and in axial direction of the tube displaceably mounted contact member scanning the edge of the skelp approaching the welding head in at least two points to follow parallel and angular dislocations of said edge, and rigid connecting means between the contact member and the welding head to adjust the latter in accordance with any of said dislocations.

3. In a machine for arc welding skelp helically bent into tubes, a control mechanism for welding heads operating at a place distanced by at least one half pitch of the helical winding from the place where opposing edges of helically bent skelp of constant width meet for the first time, comprising bending means for helically winding skelp into tubes; a carriage slidably mounted on said bending means for displacement in axial direction of the formed tube; a contact member rotatably mounted on said carriage; elastic means acting upon the carriage to keep said contact member in constant contact with the edge of the skelp being scanned thereby; a support for the welding head slidably mounted on the carriage for displacement in axial direction of the formed tube; transmission means operatively connecting said rotatable contact member and said slidable support for the welding head and adapted to transmit any rotative movement of the contact member to the said support so that the same will follow any parallel and rotational displacement of the contact member.

4. Control means according to claim 3 wherein said transmission means comprise cam means causing the transmission to adjust its transmission ratio to any variations of the width of the skelp.

References Cited in the file of this patent
UNITED STATES PATENTS
3,004,135    Diener et al. _____ Oct. 10, 1961